(12) United States Patent
Woode (10) Patent No.: US 9,017,426 B2
(45) Date of Patent: Apr. 28, 2015

(54) INTERCONNECTED SYSTEM AND METHOD FOR THE PURIFICATION AND RECOVERY OF POTASH

(71) Applicant: Martin Yeboah Woode, Kumasi (GH)

(72) Inventor: Martin Yeboah Woode, Kumasi (GH)

(73) Assignee: GC Technology Limited (TC)

( * ) Notice: Subject to any disclaimer, the term of this patent is extended or adjusted under 35 U.S.C. 154(b) by 0 days.

(21) Appl. No.: 14/266,768

(22) Filed: Apr. 30, 2014

(65) Prior Publication Data

US 2014/0241962 A1    Aug. 28, 2014

Related U.S. Application Data

(63) Continuation of application No. PCT/IB2011/055160, filed on Nov. 17, 2011.

(51) Int. Cl.

| C05D 9/00 | (2006.01) |
|---|---|
| C22B 26/10 | (2006.01) |
| C01D 7/10 | (2006.01) |
| C01D 7/12 | (2006.01) |
| C05D 1/00 | (2006.01) |
| C05F 5/00 | (2006.01) |

(52) U.S. Cl.
CPC . *C22B 26/10* (2013.01); *C01D 7/10* (2013.01); *C01D 7/126* (2013.01); *C05D 1/005* (2013.01); *C05D 9/00* (2013.01); *C05F 5/002* (2013.01); *Y10S 588/90* (2013.01)

(58) Field of Classification Search
USPC ............ 23/302 R, 295 R; 588/315, 317, 318, 588/900; 422/184.1
See application file for complete search history.

(56) References Cited

U.S. PATENT DOCUMENTS

| 3,842,762 A | 10/1974 | Sargent et al. |
|---|---|---|
| 4,037,543 A | 7/1977 | Angelo |
| 4,091,228 A | 5/1978 | Brown, Jr. et al. |
| 4,092,098 A | 5/1978 | Honaker et al. |
| 4,198,288 A | 4/1980 | Levine et al. |
| 4,199,652 A | 4/1980 | Longenecker |
| 4,206,312 A | 6/1980 | Kuhlmann |
| 4,418,893 A | 12/1983 | Middleton et al. |
| 4,584,180 A | 4/1986 | Ostrov |
| 4,787,506 A | 11/1988 | Akao |
| 4,793,269 A | 12/1988 | Dezubay et al. |
| 4,973,245 A | 11/1990 | Monni |
| 5,230,617 A | 7/1993 | Klein et al. |
| 5,350,296 A | 9/1994 | Wikstrom |
| 5,456,362 A | 10/1995 | Laskowski et al. |
| 6,315,976 B1 | 11/2001 | Phinney |
| 7,041,268 B2 | 5/2006 | Ghosh et al. |

FOREIGN PATENT DOCUMENTS

| GB | 234585 A | 6/1925 |
|---|---|---|
| GB | 234072 A | 7/1925 |
| GB | 651525 | 4/1951 |

OTHER PUBLICATIONS

Ankrah, E.K., "Chemical studies of some plant wastes from Ghana," J. Sci. Fd. Agric. vol. 25, pp. 1229-1232, 1974.
Simpson, B.K. et al., "Extraction of potash from cocoa pod husks," Agricultural Wastes, vol. 13, pp. 69 -73, 1985.
Izonfuo, W-A. L et al., "Effect of ripening on the chemical composition of plantain peels and pulps (*Musa paradisiaca*)," J. Sci. Fd. Agric., vol. 45, pp. 333-336, 1988.
Taiwo, A.A. et al., "Extraction and potential application of caustic potash from kolanut husk, ugwu pod husk and plantain peels," Scientific Research and Essay, vol. 3(10), pp. 515-517, Oct. 2008.

*Primary Examiner* — Edward Johnson
(74) *Attorney, Agent, or Firm* — Leber Patent Law P.C.

(57) ABSTRACT

The present invention provides a kiln for the combustion of agricultural waste. The kiln includes a central cylindrical combustion chamber. The central cylindrical combustion chamber includes a system for the control of combustion air to the combustion chamber. The kiln includes a second concentric cylinder surrounding the central cylindrical combustion chamber. The second concentric cylinder includes a system for the flow of cooling water through the first annulus between the central cylindrical combustion chamber and the second concentric cylinder. The kiln includes a system for the feeding of the agricultural waste into the central combustion chamber. The kiln includes a temperature sensing device to measure and display the temperature within the central combustion chamber during the combustion of the agricultural waste. The kiln includes a system for the recovery of ash from the kiln. In operation, the temperature of combustion is controlled to between 550° C. and 650° C. by a combination of increasing the supply of combustion air when the temperature in the central combustion chamber falls to near 550° C. and the introduction of cooling flowing water when the temperature in the central combustion chamber approaches 600° C.

21 Claims, 4 Drawing Sheets

INTERCONNECTED SYSTEM AND METHOD FOR THE PURIFICATION AND RECOVERY OF POTASH

RELATED APPLICATIONS

This is a continuation of International Application PCT/IB2011/055160 with an International Filing Date of Nov. 17, 2011. The entire teachings of this application are hereby incorporated by reference herein.

BACKGROUND OF THE INVENTION

This invention relates to systems and methods for the purification and recovery of potash. Potash was originally produced by leaching wood ashes and evaporating the solution in an iron pot, thus extracting potassium fertilizer.

Potash is important for agriculture because it improves water retention, yield, nutritional value, texture and disease resistance of food crops. It has wide application in the farming of fruits, vegetables, rice, wheat and other grains, sugar, corn, soybeans and cotton, all of which benefit from the nutrient's quality enhancing properties. Potash-based fertilizers have greatly contributed to economic growth in Africa, Asia and Latin America.

Because potash is a fertilizer for the above-mentioned plants, agricultural plant wastes become a reservoir of potassium from which potash can be recovered by extraction from the residue (ashes) which are left from the burning of such agricultural plant wastes. In particular, the agricultural plant wastes which are burned to ashes and from which potash is extracted preferably are cocoa pod husks, plantain (and banana) peels and cola nut husks. Thus, potash may be recovered by extraction from the residue (ashes) left from the burning of the above preferred agricultural plant wastes.

There are many patents that deal with the purification of potash from solutions of potash. Among them are the following:

U.S. Pat. No. 7,892,298, issued Feb. 22, 2011, to Toagosi Co Ltd for "Method for Producing High Purity Caustic Potash" through crystallization by bringing an aqueous solution of caustic potash into a high temperature zone.

U.S. Pat. No. 7,041,268, issued May 9, 2006, to Council of Scientific and Industrial Research for "Process for Recovery of Sulphate of Potash" from sulphate-rich bittern through the use of lime by fractionation of the bittern to obtain kainite type mixed salts and then reaction with muriate of potash to produce crude sulphate of potash.

U.S. Pat. No. 5,456,362, issued Oct. 10, 1995, to The University of British Columbia for "Flotation Process for the Flotation of Coarse Fraction of Potash Ores" by using a column flotation device in which air bubbles are generated by a sparger that utilizes high intensity shearing.

U.S. Pat. No. 4,787,506, issued Aug. 30, 1988, to Kali and Salz Aktiengesellschaft for "Electrostatic Treatment of Milled Crude Potash Salts Containing Kieserite" by conditioning sequentially with two conditioning agents and feeding the crude potash salt to an electrostatic free fall separator.

U.S. Pat. No. 4,198,288 issued Apr. 15, 1980 to Celanese Polymer Specialties Company for "Desliming of Potash Ores" by treating pulped potash ore with a polygalactomannan gum flocculant, then with a polyamine collector and then subjecting it to froth flotation.

One technical problem to be solved was that the extraction/purification of potash from crude potash still did not provide pure potash which was substantially free of sodium, chlorides, and heavy metals such as iron chromium and nickel.

This problem was attempted to be solved by the teachings of the above described U.S. Pat. No. 7,892,298, which, while it was said to provide high purity caustic potash, was silent in regard to the purification of potash (potassium carbonate). Hence the problem remains to be solved.

SUMMARY OF THE INVENTION

The applicant has discovered that this problem may be solved by way of methods that include the steps of discharging impure potash from whatever source, e.g. agricultural waste ashes, into a warm water leaching zone provided with a steam sparger to provide leached potash. The leached slurry is then passed through at least one thickener zone, e.g., through a cascade of thickener zones connected in series, to provide a partially clarified potash solution. Heavy metal ion complexes in the partially clarified potash solution are then adsorbed in an adsorption zone to provide a clarified potash solution. The clarified potash solution is partially evaporated in an evaporation zone to provide a concentrated clarified solution of potash. The concentrated clarified solution of potash is carbonated in a carbonization zone to convert the potash into potassium bicarbonate. The potassium bicarbonate is crystallized and the potassium bicarbonate crystals are separated from the mother liquor. Potassium carbonate is then regenerated from the potassium bicarbonate crystals in a heating zone. Finally the potash is ground to provide ground potash which has a purity of about 99%.

Thus by one broad aspect of the present invention, a method is provided for the purification of impure potash comprising: discharging an impure potash solution in warm water into a leaching zone provided with a steam sparger for leaching potash out of the impure potash, thereby to provide a slurry of leached potash; passing the leached potash slurry through a thickener zone to remove undissolved matter, thereby providing a potash solution substantially free of undissolved matter; passing that potash solution through an adsorption zone to adsorb heavy metal ion complexes, and thus to provide a clarified potash solution substantially-free of heavy metal ion complexes; incompletely evaporating the clarified potash solution in an evaporation zone to provide a concentrated potash solution; carbonating the concentrated potash solution in a carbonization zone to convert the potash into potassium bicarbonate; crystallizing the potassium bicarbonate; separating the potassium bicarbonate crystals from the mother liquor; regenerating potassium carbonate from potassium bicarbonate in a heating zone, thereby producing potassium carbonate of about 99% purity.

Another broad aspect of this invention provides an interconnected system for the purification of impure potash. The system includes the following interconnected apparatus elements: a leaching tank for containing the impure potash to be purified, the leaching tank including a lower sparger; a solids inlet into the leaching tank for introducing impure potash to be purified; a water inlet line for introducing water into the leaching tank; a steam inlet line for introducing sparging steam into the sparger in the leaching tank; a thickener tank; a conduit for leading sludge of impure potash from the leaching tank into the thickener tank; an evaporator for receiving overflow dilute potash solution to provide an effluent of concentrated potash; an inlet line from the thickener tank to the evaporator tank; an adsorption column for being charged with activated carbon or similar adsorbent for absorbing metal complexes from the potash solution; a conduit for leading concentrated potash effluent from the evaporator into the adsorption column to provide an effluent of concentrated potassium carbonate which is substantially-free of metal complexes; a first filter for filtering out solid particles from the concentrated potash solution which is substantially-free of metal complexes and to provide a concentrated potash solution which is substantially free of metal complexes, and which is also substantially free of solid particles; a conduit for leading a concentrated slurry of potash effluent from the adsorption column into the first filter; a carbonation column for converting the concentrated potash solution which is substantially-free of metal complexes and which is also substantially-free of solid particles into a concentrated solution of potassium bicarbonate; a conduit for leading the concentrated potash solution which is substantially-free of metal complexes, and which is also substantially free of solid particles from the first filter into the carbonation column; a crystallizer; a conduit for leading the concentrated solution of potassium bicarbonate from the carbonation column into the crystallizer; a second filter; a conduit for leading a slurry of crystallized potassium bicarbonate into the second filter to provide crystallized potassium bicarbonate which is substantially free of mother liquor; an oven for converting the crystallized potassium bicarbonate into crystallized potassium carbonate; and a conveyor for conveying a crystallized potassium bicarbonate into the oven, thereby to form crystallized potash.

By these aspects of the present invention, substantially pure potash is provided which can be used in food products and pharmaceuticals in addition to its primary use as a fertilizer.

The potash being purified may be organic potash produced by controlled combustion of agricultural wastes. The potash provided by the present invention is a substantially pure, premium product which is useful in the production of animal feed supplements, cement, fire extinguishers, photographic chemicals, textiles, in brewing beer and as a catalyst for synthetic rubber manufacturing.

DETAILED DESCRIPTION OF THE INVENTION

Figure 1:
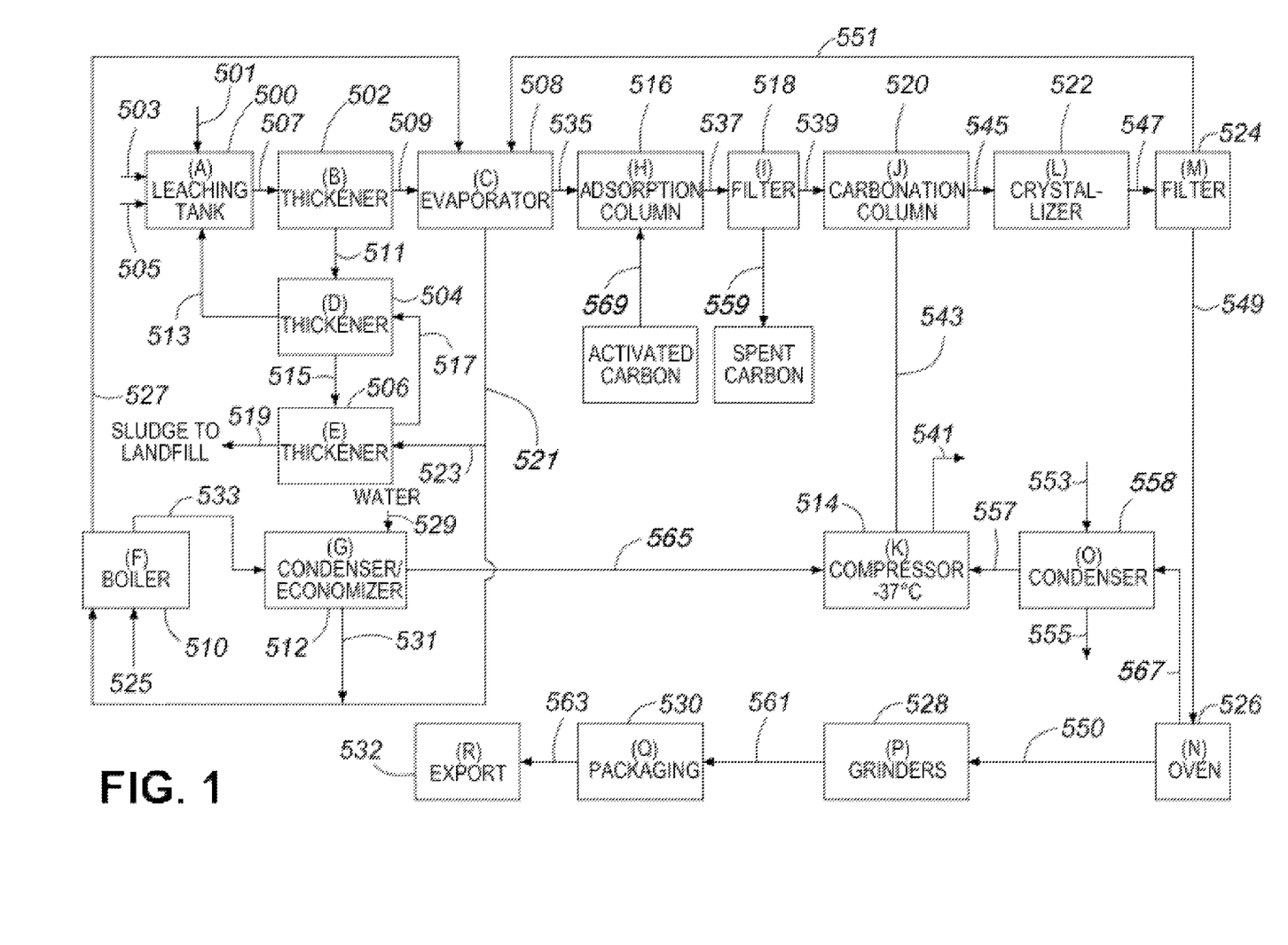
FIG. 1 is a block flow diagram of the method for the production of potash from agricultural waste ashes.

As seen in FIG. 1, the system and method for the production and purification of potash, preferably from the ashes of agricultural wastes, and more preferably the ashes of cocoa pod husks, plantain (and banana) peels and cola nut husks, includes a leaching tank 500 (BLOCK A). The leaching tank is provided with a steam sparger (not seen). In the preferred embodiment the leaching tank 500 includes an ash introduction line 501, a water inlet line 503, a steam sparging tube inlet line 505 and a potash sludge outlet line 507 leading to a first thickener 502 (BLOCK B). First thickener 502 is provided with an overflow line 509 to lead a dilute potash solution to an evaporator 508 (BLOCK C).

The system and method include several recycle systems which are shown in FIG. 1. One such recycle system comprises a second sludge line 511 from first thickener 502 to a second thickener 504 (BLOCK D). Overflow liquor from second thickener 504 is cycled back to leaching tank 500 through first overflow line 513. Sludge from second thickener 504 is passed to a third thickener 506 (BLOCK E) through third sludge line 515. Overflow liquor from third thickener 506 recycles back to second thickener 504 through second recycle line 517. Waste sludge from third thickener 506 is disposed of to land fill through disposal line 519.

A second such recycle system comprises a first condensate line 521 leading from evaporator 508 both to third thickener 506 through first branch condensate line 523, and directly to boiler 510 (BLOCK F). Boiler 510 is preferably fueled with a mixture of liquid petroleum gas and methane through fuel line 525. Steam effluent from boiler 510 exits through main steam line 527 directly to evaporator 508, and connects to steam inlet sparging line 505 to enter the lower inlet leaching tank 500. Flue gases, i.e., carbon dioxide, nitrogen and steam, pass from gas outlet of boiler 510 to condenser/economizer 512 (BLOCK G) through main gas line 533. Condenser/economizer 512 is also fed with water through water line 529. Water condensate from condenser/economizer 512 is recycled from lower outlet of condenser/economizer 512 back to boiler 510 through water condensate branch line 531, which merges into first condensate line 521. Effluent gases from condenser/economizer 512 exit condenser/economizer 512 and are carried via second gas line 565 to compressor 514 (BLOCK K) for further use as will be described later.

The concentrated potassium carbonate from evaporator 508 is fed through concentrated potassium carbonate line 535 to adsorption column 516 (BLOCK H), which is loaded with activated carbon through activated carbon loading inlet line 569. The slurry of potassium carbonate from adsorption column 516 is fed to first filter 518 (BLOCK I) through slurry line 537. Spent activated carbon is discharged from first filter 518 through spent carbon filter discharge line 559.

The filtered potassium carbonate from first filter 518 is fed to carbonation column 520 (BLOCK J) via filtered potassium carbonate slurry line 539. As referred to before, the carbon dioxide and nitrogen gases from condenser/economizer 512 lead to compressor 514 (BLOCK K) via second gas line 565. The compressor 514 preferably operates at −37 degrees C. In compressor 514, carbon dioxide is compressed and nitrogen gas is vented through vent line 541. Compressed carbon dioxide gas exits compressor 514 and is fed into carbonation column 520 (BLOCK J) through compressed carbon dioxide line 543.

The potassium bicarbonate which is formed in carbonation column 520 exits carbonation column 520 and is fed into crystallizer tank 522 (BLOCK L) via bicarbonate feed line 545. A slurry of crystallized potassium bicarbonate then exits from crystallizer tank 522 and is fed into second filter 524 (BLOCK M) via third slurry line 547. The solid potassium bicarbonate exits second filter 524 and is conveyed by conveyor 549 into oven 526 (BLOCK N). The mother liquor from second filter 524 exits second filter 524 and is cycled through mother liquor recycle line 551 back to evaporator 508.

In the oven 526, the potassium bicarbonate decomposes into crystalline potassium carbonate and effluent gases comprising carbon dioxide, nitrogen and steam are released. These effluent gases exit oven 526 and are fed into condenser 558 (BLOCK O) via third gas line 567. Condenser 558 is fed with water through cooling water line 553 to condense the steam to water, which is withdrawn through condensate water line 555. The condensed gases, nitrogen and carbon dioxide, exit condenser 558 and are fed into compressor 514 through gas line 557. Nitrogen gas is vented through second vent 541, and recovered gaseous carbon dioxide exits compressor 514 to add further carbon dioxide into carbonation column 520 through carbon dioxide line 543.

The crystalline potassium carbonate (potash) from oven 526 exits onto conveyor 550 to be conveyed to grinders 528 (BLOCK P) where it is ground, preferably to 325 mesh. The ground potassium carbonate (potash) exits grinders 528 onto conveyor 561 to be conveyed to packaging machine 530 (BLOCK Q). The packages so formed may be supplied for local uses or may be sent to export 532 (BLOCK R) via line 563.

Figure 2A:
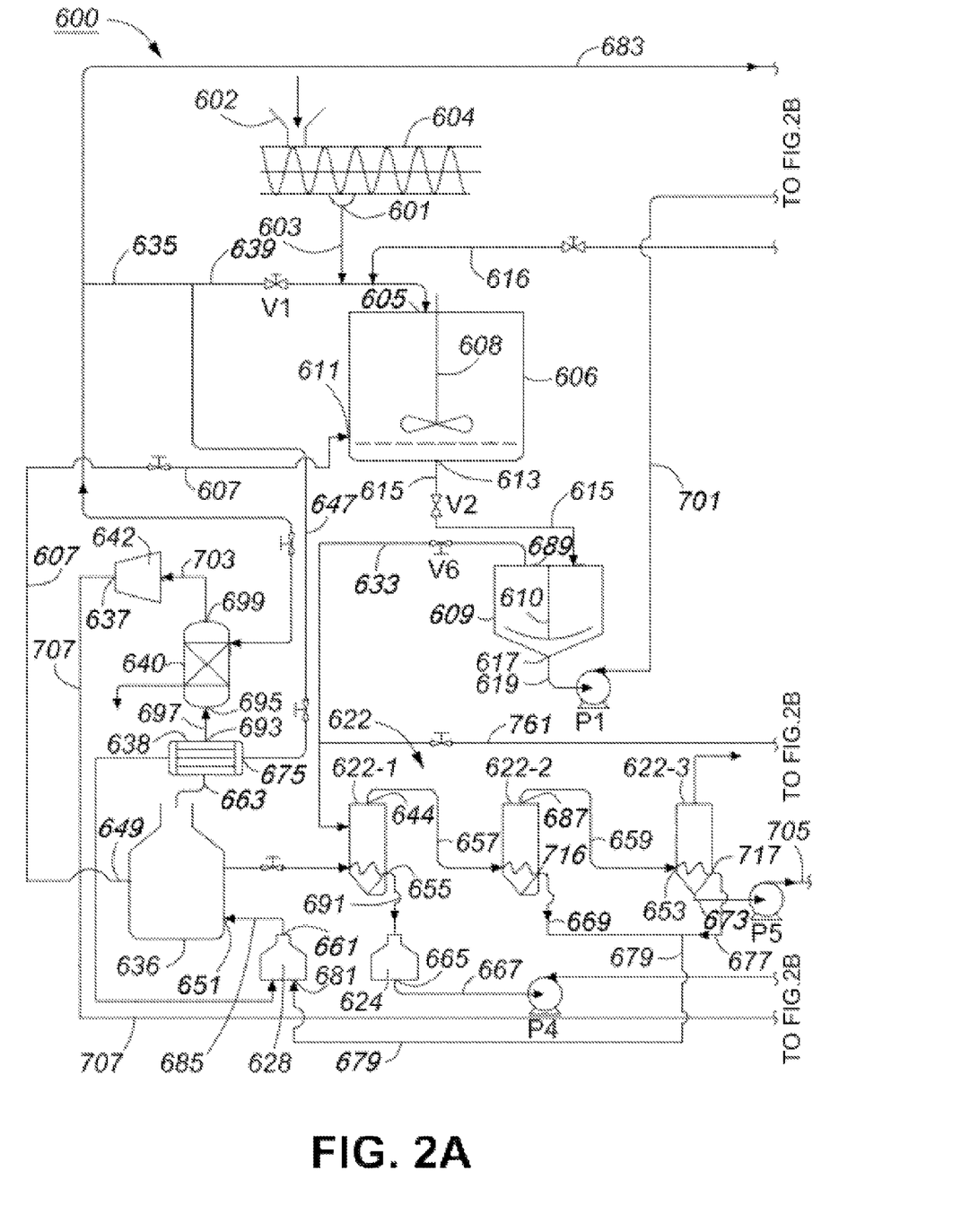
FIG. 2A, 2B and 2C are process flow diagrams of the method for the production of potash from agricultural waste ashes
Figure 2B:
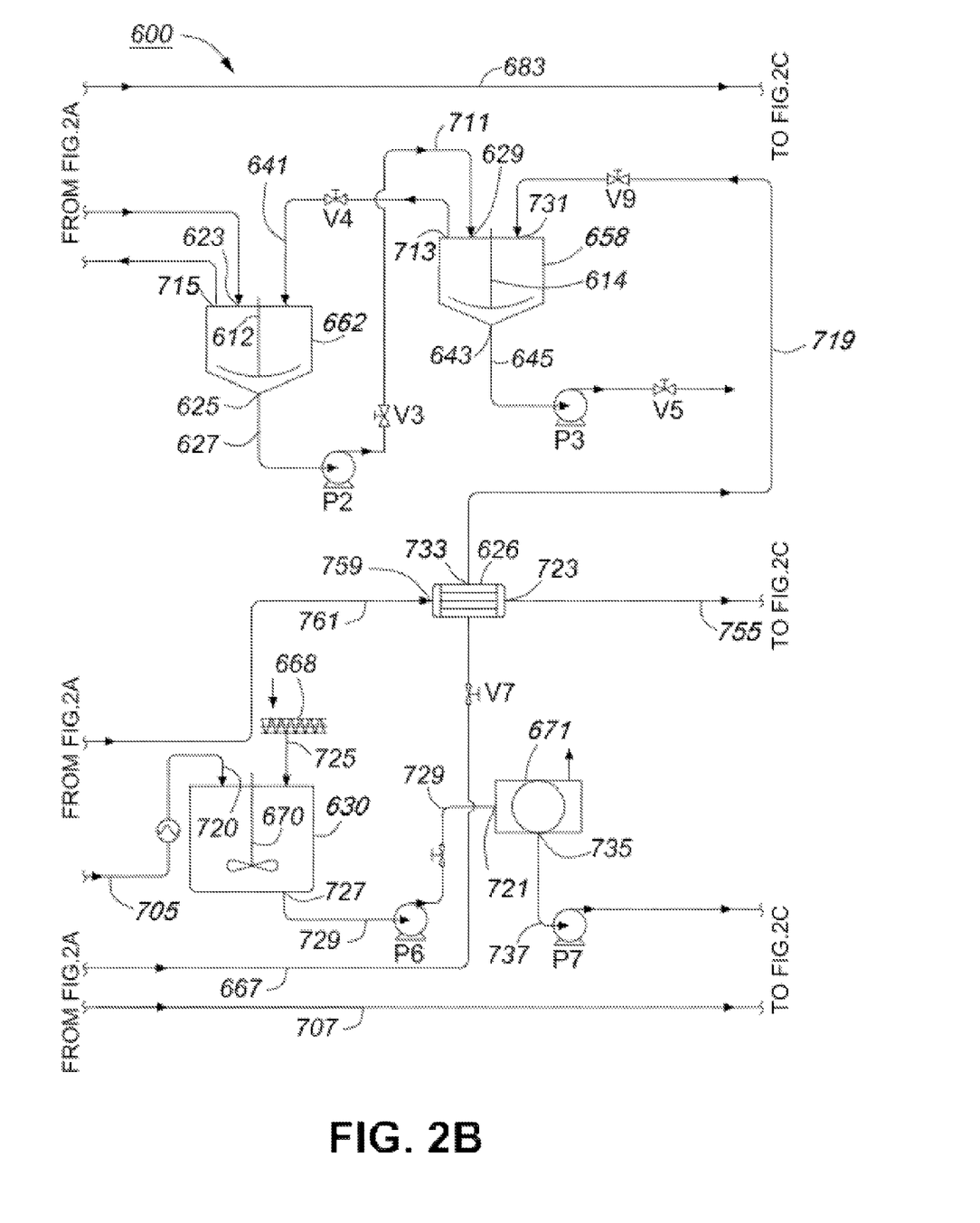
Figure 2C:
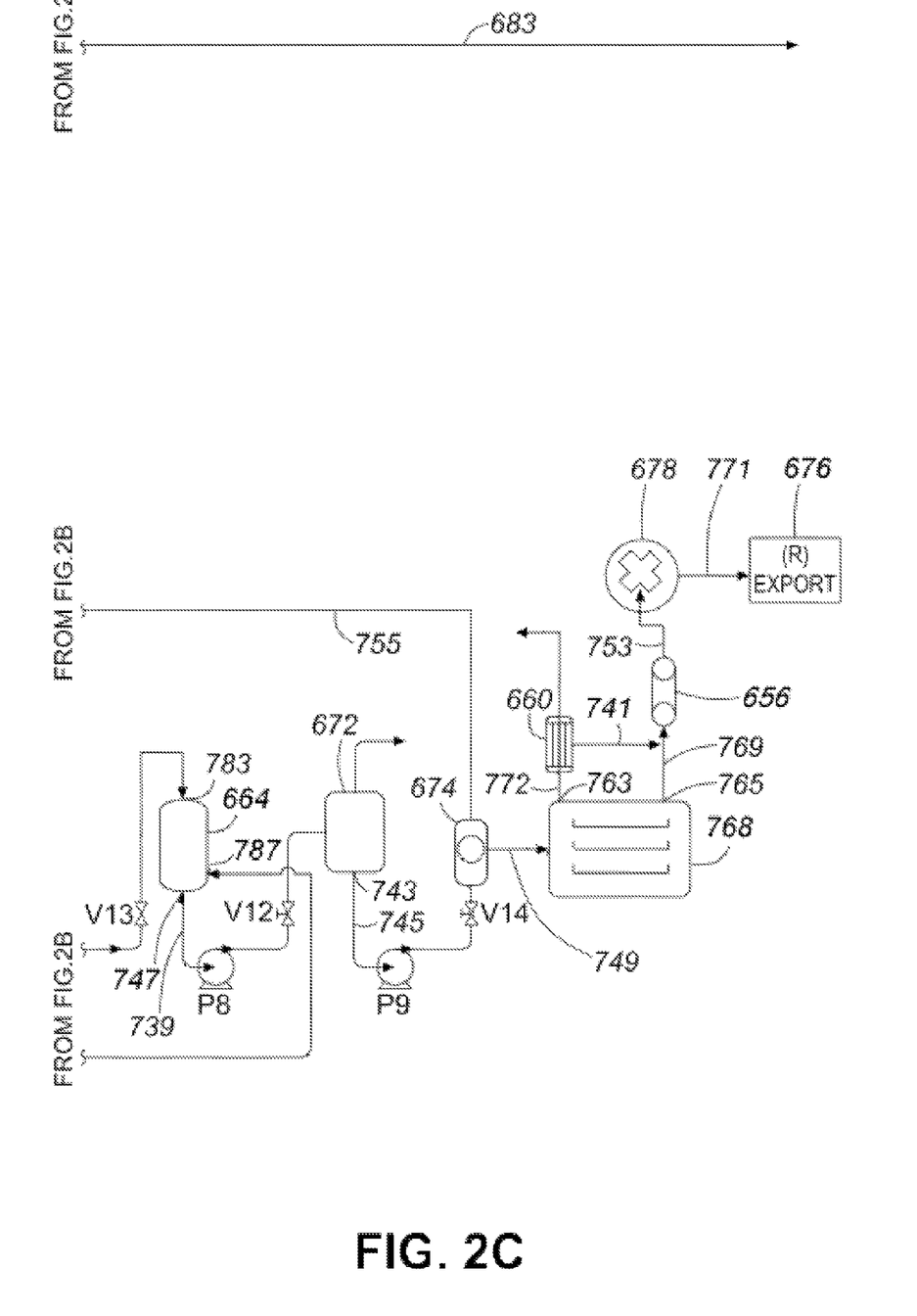

As seen in FIGS. 2A, 2B and 2C, the process flow diagram of the method and the system for the production and purification of potash from agricultural waste ashes identifies each of leaching tank 500 (BLOCK A), first thickener 502 (BLOCK B), evaporator 508 (BLOCK C), second thickener 504 (BLOCK D), third thickener 506 (BLOCK E), boiler 510 (BLOCK F), condenser/economizer 512 (BLOCK G), adsorption column 516 (BLOCK H), first filter 518 (BLOCK I), carbonation column 520 (BLOCK J), compressor 514 (BLOCK K), crystallizer tank 522 (BLOCK L), second filter 524 (BLOCK M), oven 526 (BLOCK N), condenser 558 (BLOCK O), grinders 528 (BLOCK P) and packaging machine 530 (BLOCK Q), which will be further identified by reference numbers in the "600" series and in the "700" series. In addition preferred operating conditions will be specified.

As now seen in FIGS. 2A, 2B and 2C, the process flow diagram as shown is for the method and system for the production and purification of potash from agricultural waste ashes. The process is identified by the general number 600. In the preferred embodiment, agricultural waste ashes are loaded through funnel 602 into a screw conveyor 604, preferably at a rate of 4,500 kg/hour at a temperature of about 25 degrees C. and is discharged from the screw conveyor 604 via outlet 601 and through inlet means 603 into leaching tank 606 (BLOCK A), which is provided with an interior stirrer 608. Water, through upper water inlet tube 683, is introduced through upper inlet tube 635 and through valve V1 into leaching tank 606. Steam is introduced into leaching tank 606 through lower steam sparger inlet tube 607 to flow into sparger 611 at the bottom of leaching tank 606.

In the previously described first recycle system in FIG. 1, warm sludge of agricultural waste ashes is selectively discharged from lower outlet 613 from leaching tank 606 under the control of valve V2 and through first sludge line 615, into first thickener 609 (BLOCK B). First thickener 609 includes a bottom scraper/mixer 610. Thickened potassium chlorate is discharged from first thickener 609 through lower outlet 617 and first discharge line 619 and is pumped, via pump P1 and first sludge line 701, to inlet 623 of a second thickener 662 (BLOCK D). Second thickener 662 also includes a bottom scraper/mixer 612. Thickened potassium chlorate is discharged through the lower outlet 625 of second thickener 662 through second discharge line 627 and is pumped, via pump P2 and valve V3, and through extension of discharge line 711 as third slurry line to inlet 629 of third thickener 658 (BLOCK E). Third thickener 658 also includes a bottom scraper/mixer 614. Overflow sludge from second thickener 662 exits through upper outlet 715 and is cycled back to leaching tank 606 via line 616. Overflow sludge from third thickener 631 exits through upper outlet 713 and is cycled back to second thickener 662 through valve V4 and second cycle line 641. Waste sludge from third thickener 658 exits through lower outlet 643 and is disposed of to land fill through disposal line 645 aided by pump P3 and valve V5.

Overflow dilute potassium carbonate from first thickener 609 flows from upper outlet 689 through first overflow line 633 and valve V6 into an evaporator system identified by the general number "622" (BLOCK C). Evaporator system 622 comprises triple effect, cascaded evaporators 622-1, 622-2 and 622-3 connected in series. Overflow dilute potassium carbonate line 633 and valve V6 feed the first triple effect evaporator 622-1 to initiate the evaporation procedure. The lower outlet 655 of the first triple effect evaporator 622-1 is connected to potassium carbonate holding tank 624 via first outlet line 691, from whence it is pumped, via lower outlet 665 through line 667, pump P4 and valve V7, to heat exchanger 626 for a purpose to be explained later. The upper outlet 644 of the first triple effect evaporator 622-1 is connected to the lower inlet of the second triple effect evaporator 622-2 via first connecting line 657. The upper outlet 687 of the second triple effect evaporator 622-2 is connected to the lower inlet 653 of the third triple effect evaporator 622-3 via second connecting line 659.

The combined intermediate outlets 716 and 717 of the triple effect evaporators 622-2 and 622-3, respectively, are led via outlet lines 669 and 677 to connected line 679 and then to lower inlet 681 of potassium carbonate pretreatment tank 628. The upper outlet 661 of potassium carbonate pretreatment tank 628 leads, via line 685 to the lower inlet 651 of boiler 636 (BLOCK F). Most of the steam produced in boiler 636 is directed via steam inlet sparging tube 649 leading to steam sparger inlet tube 607 to the sparger 611 at the bottom of leaching tank 606. The principal gaseous outlet from boiler 636, namely carbon dioxide, nitrogen and any residual steam, is led via gas line 663 into the condenser 638 whose outlet 693 is connected to the inlet 695 of the connected economizer 640 by inlet line 697. Condenser 638 and connected economizer 640 together constitute (BLOCK G).

In the condenser 638, water is condensed out of condenser 638 and is discharged through outlet 675 to water condensate discharge line 647 which includes a branch line 639 leading to the upper inlet 605 of leaching tank 606 and a main water line 683 for unspecified use which may, for example, be for irrigation purposes. The outlet 699 from connected economizer 640 containing carbon dioxide and nitrogen leads via line 703 to the compressor 642 (BLOCK K), then via outlet 637 and line 707 to the lower inlet 787 of carbonation column 664 (BLOCK J).

The lower outlet line 673 from the third triple effect evaporator 622-3 is pumped, via pump P5, through concentrated potassium carbonate line 705 to the upper inlet 720 of adsorption tank 630 (BLOCK H). Activated carbon from screw conveyor 668 is charged into adsorption tank 630 through activated carbon loading line 725. Adsorption tank 630 is equipped with a stirrer 670.

A slurry of potassium carbonate is led from the lower outlet 727 of adsorption tank 630 via line 729 and pump P6 to the intermediate inlet 721 of first filter 671 (BLOCK I). The clarified slurry of potassium carbonate so formed is pumped by pump P7 from lower outlet 735 of first filter 671 and through line 737 and valve V13 to the upper inlet 783 of previously mentioned carbonation column 664, i.e. (BLOCK K), to form a slurry of potassium bicarbonate.

The slurry of potassium bicarbonate produced in carbonation column 664 exits carbonation column 664 through the lower outlet 747 and is led through outlet line 739 and by pump P8 and valve V12 to crystallizer 672 to provide crystalline potassium bicarbonate. The crystalline potassium bicarbonate exits through the lower outlet 743 of crystallizer 672 and is led through outlet line 745 and by pump P9 and valve V14 to filter 674 (BLOCK M). The filtered crystalline potassium bicarbonate is conveyed by conveyor 749 into oven 768 (BLOCK N). The mother liquor from filter 674 is fed by filtrate line 755 to inlet 723 of heat exchanger 626 where it is combined with slurry from first thickener 609 via slurry line 761 to inlet 759. In heat exchanger 626, the slurry and mother liquor are cooled and are returned to the third thickener 658 from outlet 733 of heat exchanger 626 to inlet 731 of third thickener 658 via line 719 and valve V9.

In the oven 768, the potassium bicarbonate is decomposed into crystalline potassium carbonate (potash) and gaseous carbon dioxide, nitrogen and steam. Such stream of gaseous carbon dioxide, nitrogen and steam exits through upper outlet 763 of oven 768 and is fed, via line 772 to a condenser 660 (BLOCK O). The description of condenser 660 is not duplicated in FIG. 2A but its function is completely described in FIG. 1.

The crystalline potassium carbonate (potash) from oven 768 exits through outlet 765 and is conveyed by conveyor 769 to grinder 656 (BLOCK P) where it is finely ground, e.g. to 325 mesh. The ground potassium carbonate (potash) is conveyed by conveyor 753 to packaging machine 678 (BLOCK Q). The packages so formed may be supplied for local use or may be conveyed by conveyor 771 to be exported 676 (BLOCK R).

As previously described in FIGS. 1, 2A, 2B and 2C, the first step in the extraction/purification of the potash, which preferably is organic potash produced by controlled combustion of agricultural wastes, preferably the ashes of cocoa pod husks, plantain (and banana) peels and cola nut husks, consists of discharging the ashes, containing typically about 77% potash, into water in preferably one or more stainless steel leaching tanks connected in series, which are of the CSTR type, each of which is equipped with a steam sparger. The impeller speed is set at a predetermined rpm. The temperature of the leaching is set to between 90° C. and 100° C.

Next, the leached slurry is sent preferably through a cascade of thickeners to remove un-dissolved matter and to form a clarified potash solution. The ash waste is then thoroughly washed until it contains practically no potash.

Next, the clarified potash solution is sent into an evaporator to concentrate the potash solution to saturation, i.e., about 60.8% potash concentrate.

Next, the potash concentrate is mixed, preferably in a stainless steel tank, with an adsorbent, preferably activated carbon, the quantity being about 3% of its mass to the potash concentrate. The activated carbon adsorbs ferric ion complexes and clarifies the solution. Next, the spent carbon is filtered out of the concentrated clarified solution with the aid of a filter and the filtrate is sent to a packed carbonation column. In the packed carbonation column, the filtrate is carbonated to potassium bicarbonate. The packing is preferably an Intalox™ packing.

Next, the bicarbonate solution is sent into a crystallizer operating from a maximum of about 90° C. down to a minimum of 30° C., from where it is sent to another filter to separate the crystals from the mother liquor. The mother liquor is returned into the evaporator while the bicarbonate crystals obtained are sent to an oven to regenerate the potash and to release carbon dioxide. The carbon dioxide is returned for reuse.

The potash which is obtained and which is of about 99%+ purity, is ground into powder for market. This final product potash is widely used in the fertilizer, soap, petrochemical, glass, food and pharmaceutical industries among others.

In summary, the benefit of achieving this ability to produce substantially pure potash, preferably from organic potash produced from the ashes of agricultural wastes by controlled combustion of agricultural wastes, and preferably the ashes of cocoa pod husks, plantain (and banana) peels and cola nut husks, is that it generates a finished potash product, which unlike unpurified mined potash, is substantially free from arsenic, and is therefore useable in the food and the pharmaceutical additives industries.

EXAMPLE

This is an example of the controlled combustion of cocoa pod husks to form ashes, although it is equally applicable to the controlled combustion of the other agricultural wastes, e.g. plantain (and banana) peels and cola nut husks.

The controlled combustion is preferably carried out in the kiln which is disclosed and claimed in co-pending PCT application filed on even date herewith by the present applicant. Briefly, the kiln includes a central combustion chamber. The central combustion chamber includes a system for the control of combustion air to the combustion chamber. The kiln includes a second cylindrical chamber surrounding the central combustion chamber. The second cylindrical chamber includes a system of the flow of cooling water through the first annulus between the central combustion chamber and the second cylindrical chamber. The kiln includes a system for the feeding of the plant waste into the central combustion chamber. The kiln includes a temperature-sensing device to measure and display the temperature within the central combustion chamber during the combustion of the waste plant material. The kiln includes a system for the recovery of ash from the ashes.

In operation, the temperature of combustion is controlled to between 550° C. and 650° C. by a combination of increasing the supply of combustion air when the temperature in the central combustion chamber falls to near 550° C. and the introduction of cooling flowing water when the temperature in the central combustion chamber approaches 650° C. The cocoa pod husks are formed into ashes in the above-described portable kiln at an average temperature of about 600° C. (i.e. between about 550° C. and about 650° C.).

To achieve the leaching of the potash from the so-produced ashes, the ashes are transported to a leaching facility, preferably as described with respect to FIG. 1, FIG. 2A, FIG. 2B and FIG. 2C. At this facility, the leaching of the potash from the ash is carried out using warm water, i.e., at about 80° C. to about 100° C. The leached potash goes through several leaching purification processes, as described with respect to FIG. 1 and FIG. 2 until it attains a purity of over 99%.

Ash yield from the dried husks consisted of about an average of 7.2%. The resulting ash contained about 75% potash as potassium carbonate.

Unlike mined potash which is contaminated with heavy metals (e.g. arsenic) the main 1% of impurities in this organic potash are iron, calcium and magnesium. This makes the organic potash a premium product which is suitable for the pharmaceutical and food industries. This potash is also useful in the production of animal feed supplements, cement, fire extinguishers, photographic chemicals, textiles, in brewing beer and as a catalyst for synthetic rubber manufacturing.

What is claimed is:

1. A method for the purification of impure potash, the method comprising:
   a) discharging the impure potash in an aqueous solution into a leaching zone provided with a steam sparger, and leaching potash out of the impure potash, thereby producing leached potash slurry;
   b) passing the leached potash slurry through at least one thickener zone to provide a thickened potash solution;
   c) partially evaporating the thickened potash solution in an evaporation zone to provide a concentrated, thickened potash solution;
   d) passing the concentrated, thickened potash solution through an adsorption zone to adsorb heavy metal ion complexes, and thus to provide a clarified, concentrated, thickened potash solution;
   e) passing the clarified, concentrated, thickened potash solution through a first filter zone to filter out solid particles and to provide a concentrated potash solution;

f) carbonating the concentrated potash solution in a carbonization zone, thereby producing potassium bicarbonate;

g) crystallizing the potassium bicarbonate in a crystallization zone into potassium bicarbonate crystals from mother liquor;

h) separating the potassium bicarbonate crystals from the mother liquor in a second filter zone, thereby producing separated potassium bicarbonate crystals and separated mother liquor; and i) regenerating potassium carbonate from the separated potassium bicarbonate in a heating zone, thereby to produce potash of about 99% purity.

2. The method of claim 1 further comprising burning agricultural waste to produce ashes to be used as the impure potash.

3. The method of claim 2 wherein the agricultural waste comprises one or more of cocoa pod husks, plantain peels, banana peels and cola nut husks.

4. The method of claim 1, wherein the aqueous solution is at a temperature of about 90° C. to about 100° C.

5. The method of claim 1, wherein the concentrated, thickened potash solution contains about 60% potash.

6. The method of claim 1, wherein the crystallization zone is at a minimum temperature of about 30° C. to a maximum temperature of about 90° C.

7. The method of claim 2, further comprising washing the ashes thoroughly until they contain substantially no potash, thereby producing wash water, and combining the wash water with water which is introduced into the leaching zone.

8. The method of claim 1, wherein the leached potash slurry is passed through a cascade of a plurality of thickener zones connected in series.

9. The method of claim 8, further comprising at least one of: recycling overflow liquor from a third zone of the plurality of thickener zones to a second zone of the plurality of thickener zones; or recycling overflow liquor from the second zone of the plurality of thickener zones to the leaching zone; or discharging waste sludge from the third zone of the plurality of thickener zones.

10. The method of claim 1, wherein effluent from the evaporation zone passes to a boiler zone and is converted into flue gases comprising carbon dioxide, nitrogen and steam; and condensing the flue gases to provide carbon dioxide which is compressed to provide compressed carbon dioxide for introduction into the carbonation zone.

11. The method of claim 1, wherein the separated mother liquor is returned to the evaporation zone.

12. The method of claim 1 wherein the regenerating of potassium carbonate from the potassium bicarbonate in the heating zone simultaneously produces carbon dioxide which is charged into a compressor zone for supplying additional carbon dioxide for the carbonation zone.

13. The method of claim 1, further comprising grinding the potassium carbonate to provide ground potash of about 99% purity.

14. An interconnected system for the purification of impure potash, the interconnected system comprising:

a) a leaching tank for containing impure potash to be purified, the leaching tank including a steam sparger;

b) a solids inlet into the leaching tank for introducing impure potash to be purified;

c) a water inlet line for introducing water into the leaching tank;

d) a steam inlet sparging line for introducing sparging steam into the steam sparger in the leaching tank;

e) a thickener;

f) a conduit for leading sludge of the impure potash from the leaching tank into the thickener;

g) an evaporator for receiving overflow dilute potash solution to provide an effluent of concentrated potash;

h) an inlet line from the thickener to the evaporator which produces concentrated potash solution;

i) an adsorption column for being charged with an adsorbent for absorbing metal complexes from the concentrated potash solution;

j) a conduit for leading concentrated potash effluent from the thickener tank into the adsorption column to provide an effluent of concentrated potassium carbonate which is substantially free of metal complexes;

k) a first filter for filtering out solid particles from the concentrated potash solution which is substantially free of metal complexes and for providing a concentrated potash solution which is substantially free of metal complexes, and which is also substantially free of solid particles;

l) a conduit for leading a concentrated slurry of potash effluent from the adsorption column into the first filter;

m) a carbonation column for converting the concentrated potash solution, which is substantially free of metal complexes, and which is also substantially free of solid particles, into a concentrated solution of potassium bicarbonate;

n) a conduit for leading the concentrated potash solution which is substantially free of metal complexes, and which is also substantially free of solid particles from the first filter into the carbonation column;

o) a crystallizer;

p) a conduit for leading the concentrated solution of potassium bicarbonate from the carbonation column into the crystallizer;

q) a second filter;

r) a conduit for leading a slurry of crystallized potassium bicarbonate into the second filter to provide crystallized potassium bicarbonate which is substantially free of mother liquor;

s) an oven for converting the crystallized potassium bicarbonate which is substantially free of mother liquor into crystallized potassium carbonate; and t) a conveyor for conveying the crystallized potassium bicarbonate into the oven.

15. The interconnected system of claim 14, further comprising:

one or more thickeners;

a recycle line from the one or more thickeners to recycle overflow liquor back to the leaching tank; and a sludge discharge line from the one or more thickeners to discharge waste sludge.

16. The interconnected system of claim 14, further comprising a plurality of thickeners connected in a cascading series.

17. The interconnected system as in claim 14, further comprising:

a condensate line from the evaporator to a boiler; and a steam line from the boiler to the steam inlet sparging line.

18. The interconnected system as in claim 14, further comprising:

a condenser/economizer for receiving effluent gases comprising carbon dioxide, nitrogen and steam and for conveying carbon dioxide and nitrogen from a boiler, a gas line leading carbon dioxide and nitrogen gases from the condenser/economizer to a compressor; and a compressed carbon dioxide line for leading compressed carbon dioxide from the compressor to the carbonation column to form potassium bicarbonate.

19. The interconnected system of claim 14, further comprising:
a condenser for receiving effluent gases comprising carbon dioxide, nitrogen, and steam from the oven; and
a line for conveying carbon dioxide and nitrogen from the condenser to the carbonation column.

20. The interconnected system of claim 14, further comprising a grinder for grinding the crystallized potassium carbonate to ground, crystallized potassium carbonate.

21. The interconnected system of claim 20, further comprising a packaging machine for packing the ground, crystallized potassium carbonate, and a conveyer for conveying the ground, crystallized potassium carbonate to the packaging machine.

* * * * *